United States Patent
Park et al.

(10) Patent No.: US 8,172,254 B2
(45) Date of Patent: May 8, 2012

(54) COLLAPSIBLE STROLLER FRAME

(75) Inventors: Frederick K. Park, Rocky Mount, NC (US); Paul Bradley Forrest, Cary, NC (US); Michael Dickson, Cary, NC (US)

(73) Assignee: Frederick K. Park, Rocky Mount, NC (US)

( * ) Notice: Subject to any disclaimer, the term of this patent is extended or adjusted under 35 U.S.C. 154(b) by 736 days.

(21) Appl. No.: 11/849,408

(22) Filed: Sep. 4, 2007

(65) Prior Publication Data
US 2009/0058026 A1 Mar. 5, 2009

(51) Int. Cl.
B62B 7/08 (2006.01)
(52) U.S. Cl. .................. 280/647; 280/47.38; 280/47.39; 280/650; 280/642; 280/644
(58) Field of Classification Search .............. 280/47.18, 280/47.24, 47.25, 47.38–47.4, 47.131, 639, 280/642–644, 647–650
See application file for complete search history.

(56) References Cited

U.S. PATENT DOCUMENTS

| | | | | | |
|---|---|---|---|---|---|
| 2,616,718 | A | * | 11/1952 | Heideman | 280/650 |
| 2,976,912 | A | * | 3/1961 | Dias | 280/658 |
| 3,990,717 | A | * | 11/1976 | Best | 280/278 |
| 4,353,577 | A | * | 10/1982 | Giordani | 280/642 |
| 4,684,149 | A | * | 8/1987 | Meyer | 280/650 |
| 5,056,805 | A | * | 10/1991 | Wang | 280/47.36 |
| 5,299,825 | A | * | 4/1994 | Smith | 280/644 |
| 5,364,119 | A | * | 11/1994 | Leu | 280/647 |
| 6,102,431 | A | | 8/2000 | Sutherland et al. | |
| 6,974,150 | B2 | * | 12/2005 | Jane Santamaria | 280/647 |
| 7,017,938 | B2 | * | 3/2006 | Kinzel | 280/650 |
| 7,188,858 | B2 | * | 3/2007 | Hartenstine et al. | 280/642 |
| 7,264,257 | B2 | * | 9/2007 | Sanders | 280/278 |
| 7,396,039 | B2 | * | 7/2008 | Valdez et al. | 280/644 |
| 2002/0050700 | A1 | * | 5/2002 | Stohr et al. | 280/650 |
| 2005/0046152 | A1 | * | 3/2005 | Hutchinson | 280/642 |
| 2005/0121877 | A1 | * | 6/2005 | Groendal et al. | 280/287 |
| 2006/0125211 | A1 | * | 6/2006 | Jane Santamaria | 280/643 |
| 2006/0175797 | A1 | | 8/2006 | Sanders | |
| 2006/0255564 | A1 | * | 11/2006 | Ayre | 280/642 |
| 2007/0069504 | A1 | * | 3/2007 | Lan | 280/642 |
| 2008/0054601 | A1 | * | 3/2008 | Li | 280/642 |
| 2008/0061534 | A1 | * | 3/2008 | Chen | 280/647 |
| 2008/0106070 | A1 | * | 5/2008 | Lan | 280/647 |
| 2008/0191451 | A1 | * | 8/2008 | Driessen | 280/650 |

FOREIGN PATENT DOCUMENTS

WO WO 2006031111 A2 * 3/2006

* cited by examiner

*Primary Examiner* — J. Allen Shriver, II
*Assistant Examiner* — Travis Coolman
(74) *Attorney, Agent, or Firm* — Coats & Bennett, P.L.L.C.

(57) ABSTRACT

A collapsible support frame has a front frame, a rear frame, and a locking mechanism connected to the front and rear frames. The locking mechanism has a lever and a base member. In the locked position, the lever and the base member engage to pull the front and rear frames towards each other. This places tension on the front and rear frames and holds the frame structure in an open or unfolded position for use. In the unlocked position, the lever and the base member separate from each other. This releases the tension placed on the front and rear frames and allows the frame structure to collapse or fold in on itself for storage.

25 Claims, 8 Drawing Sheets

COLLAPSIBLE STROLLER FRAME

BACKGROUND

The present invention relates generally to frame structures, and particularly to frame structures for collapsible strollers.

Conventional strollers have a lightweight, foldable frame structure to facilitate storage when not in use. Usually, foldable frame structures have a plurality of elongated tubes pivotably attached at specified points along their lengths. To collapse or fold the stroller for storage, the user typically releases a locking mechanism and pushes each side of the frame structure inward. This causes the sides of the stroller to fold inward, and also raises one or more wheels connected to the frame structure. The folded stroller has a drastically reduced size in terms of height and width, but not in length. Specifically, the length of a stroller as measured from the front wheels to the handles is substantially the same in both the folded and unfolded positions. Thus, strollers having conventional frame structures remain large and bulky even when in a folded position. This can prevent a user from storing the folded stroller in some areas.

SUMMARY

In one embodiment, a collapsible support frame is configured to move between an open, unfolded state for use, and a folded or collapsed state for storage. In the collapsed state, the support frame has reduced dimensions for height, width, and length to facilitate storage in small areas.

The support frame comprises a front frame, a rear frame, and a locking mechanism. The front frame comprises a plurality of tubular frame members that are pivotably connected to each other via hinges. The rear frame also includes a plurality of tubular frame members that pivotably connect at a central hub. At least two of the rear frame members extend outward from the hub and pivotably connect to opposing sides of the front frame.

The locking mechanism comprises two independent housings that cooperate to lock and unlock the frame structure. The base member pivotably connects to the hub, while a pair of tension members extends from the lever to connect to the opposing sides of the front frame. In the locked position, the lever and the base member join together to pull the front and rear frames towards each other. This pulling force tensions the front and rear frames to maintain the frame structure in the open or unfolded position. In the unlocked position, the lever and the base member separate from each other. This separation releases the tension placed on the front and rear frames by the tension members, and allows the frame structure to collapse for storage.

DETAILED DESCRIPTION

Figure 1:
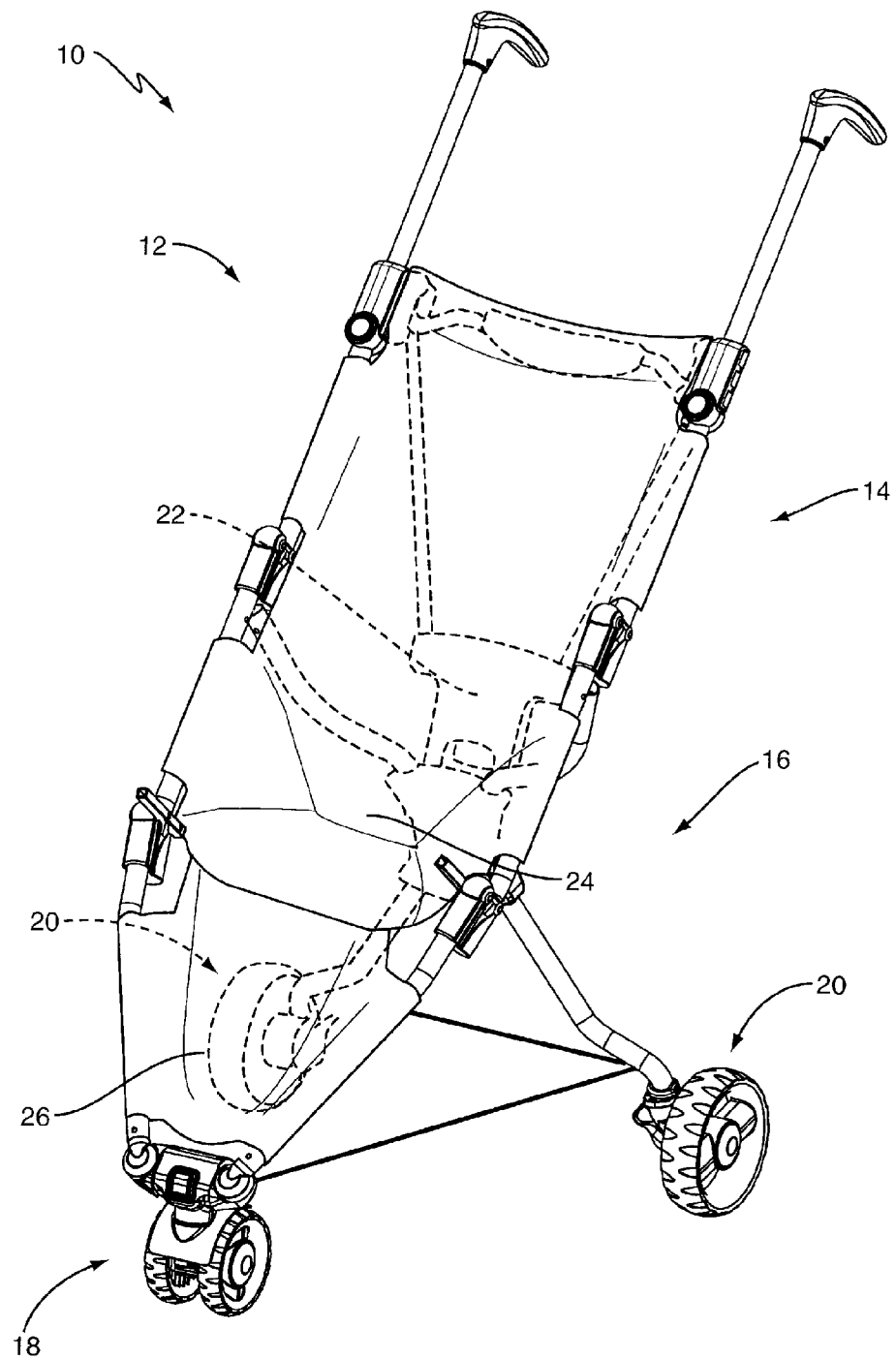
FIG. 1 is a front perspective view of one embodiment of the present invention.

FIG. 1 illustrates a front perspective view of a stroller 10 having a collapsible frame structure 12 configured according to one embodiment of the present invention. Although the figures and the specification describe embodiments of the present invention in terms of a stroller, this is for illustrative purposes only. Those skilled in the art should appreciate that the collapsible frame structure 12 may be used with any wheeled carrier capable of being unfolded for use and folded for storage.

The collapsible frame structure 12 is configured to move between a folded position and an unfolded position. In the unfolded position, the frame structure opens and locks to support the weight of a child, for example, seated in the stroller 10. In the unfolded position, the frame structure 12 collapses to reduce the height, width, and length dimensions of the stroller 10. Because of these reduced dimensions, a user may store the stroller 10 in places that would normally be too small for a stroller 10 having a conventional folding frame.

Frame structure 12 comprises a front frame 14, a rear frame 16, a front wheel assembly 18, a pair of rear wheel assemblies 20, and a locking mechanism 22. A flexible sheet of material fixedly attaches to the front frame 14 using mechanical fasteners or other means known in the art to form a seat 24 and a footrest 26 for a child seated in the stroller 10. The material extends between opposing sides of the front frame 14 and may be any material known in the art; however, in one embodiment, the flexible material comprises a flexible nylon fabric.

Figure 2:
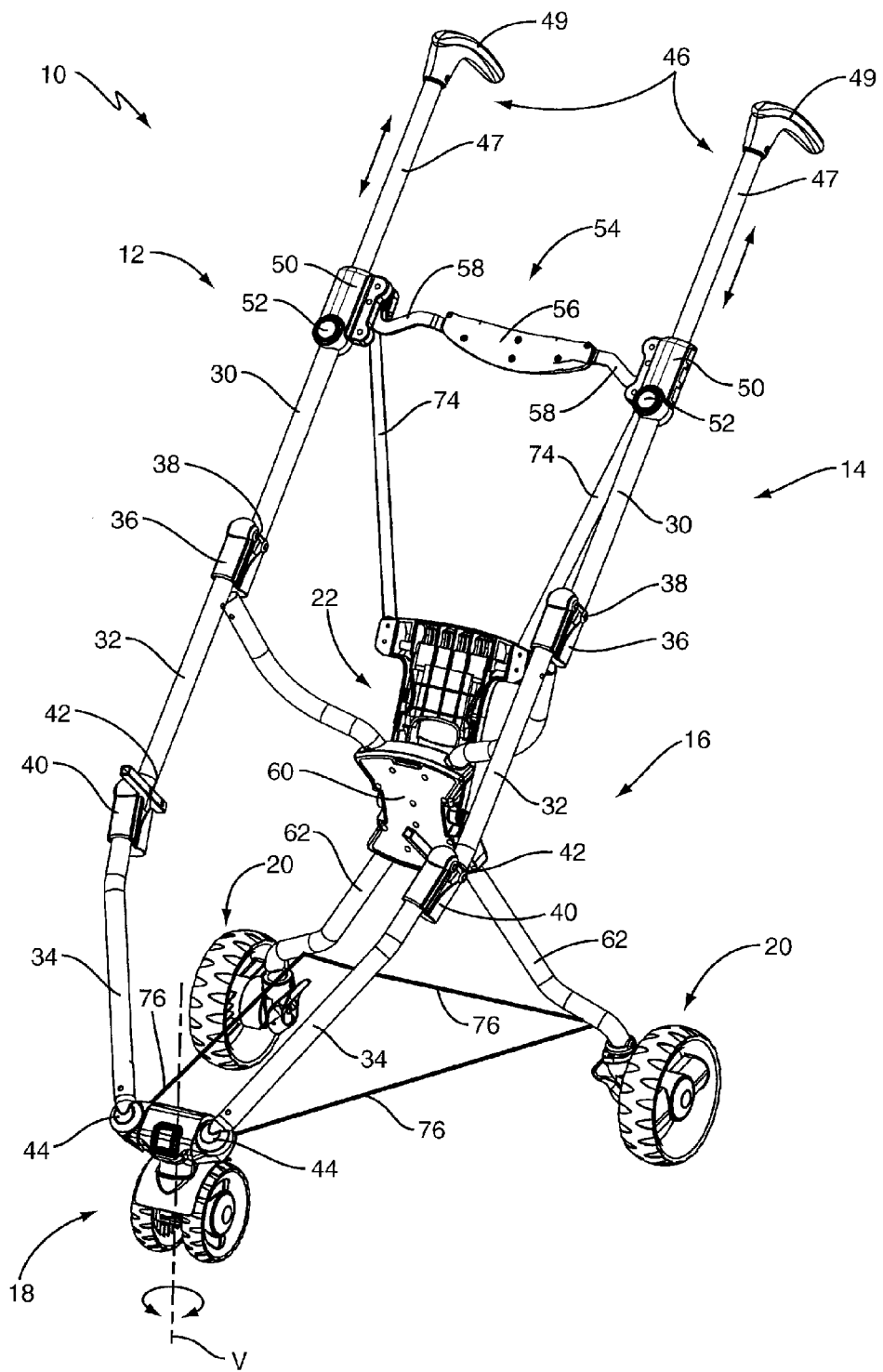
FIG. 2 is a front perspective view of a frame structure according to one embodiment of the present invention.
Figure 3:
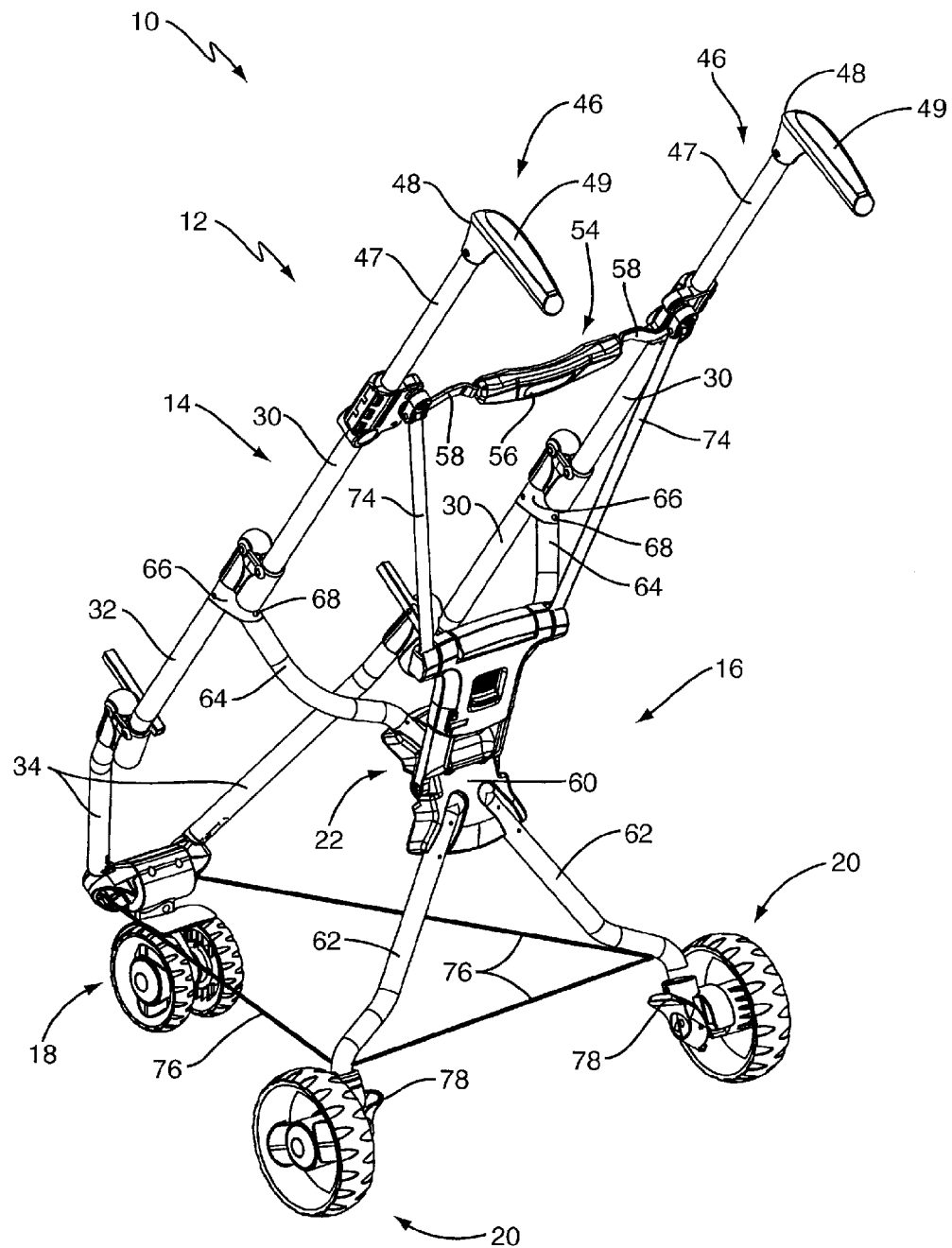
FIG. 3 is a rear perspective view of a frame structure according to one embodiment of the present invention.

FIGS. 2 and 3 illustrate front and rear perspective views of the frame structure, respectively. These figures do not illustrate the flexible material that forms the seat 24 and foot rest 26 for the sake of clarity.

Front frame 14 comprises a plurality of interconnected but independent tubular frame members that extend to form the sides of stroller 10. In this embodiment, front frame 14 comprises a pair of opposing upper frame members 30, a pair of opposing intermediate frame members 32, and a pair of opposing lower frame members 34 that connect to front wheel assembly 18 via corresponding pivot joints 44. Each frame member 30-34 pivotably connects to at least one other frame member, and comprises lightweight tubing manufactured from a metal or metal alloy, such as aluminum. Alternatively, the frame members 30-34 may be manufactured from a hard plastic or other suitable lightweight but sturdy material.

Each upper frame member 30 pivotably connects to an intermediate frame member 32 via a hinge 36. Similarly, each intermediate frame member 32 connects to a lower frame member 34 via a hinge 40. When moving between the folded and unfolded positions, the frame members 30, 32 pivot relative to each other about a pivot joint 38, while frame members 32, 34 pivot relative to each other about a pivot joint 42. In this embodiment, for example, the upper and lower frame members 30, 34 pivot towards their respective intermediate frame members 32 when the frame structure 12 moves to the folded position. The pivot joints 38, 42 may be, for example, rivets or other mechanical fasteners that connect the hinges 36, 40 to their respective frame members 30-34.

Front frame 14 further comprises a pair of opposing extendable handles 46. Each handle 46 includes an elongated tube 47 having a plastic handle 48 attached at one end. The handles 48 may be arcuate, and may include a padded grip 49 on one surface for the user's comfort. The elongated tubes 47 are sized to slide into and out of a handle lock 50 and the upper frame members 30. The handle lock 50, which is disposed on each upper frame member 30, includes a spring-loaded actuator 52 that allows the user to extend the tubes 47 into and out of the upper frame members 30. Particularly, the user simply depresses the actuators 52 and pulls the handles 46 to extend them out of the upper frame members 30 and the handle lock 50. When the user releases the actuators 52, the elongated tubes 47 lock into place, and the handles 46 are ready for use. To lower the handles 46 for storage, the user depresses actuators 52 and pushes the handles 46 such that the tubes 47 slide into the upper frame members 30 and the handle lock 50.

For stability, the front frame 14 may also include an articulated cross-member 54 that extends laterally between the upper frame members 30. The cross-member 54 comprises a central part 56 and a pair of end links 58 pivotably connected at each end of the central part 56. The central part 56 is formed from a hard, lightweight material, such as plastic, and may be sized and shaped to function as a carrying handle for the user. The end links 58, which may be constructed from plastic, a metal, or metal alloy, for example, interconnect the central part 56 to the upper frame members 30. In this embodiment, the end links 58 pivotably interconnect the central part 56 to the handle locks 50; however, the end links 58 may pivotably connect directly to the upper frame members 30 if desired. When the stroller 10 is in the unfolded position, the central part 56 and the end links 58 are rigid, and thus, exert an outward force on the upper frame members 30 that pushes them away from each other. This force helps to prevent the frame structure 12 from collapsing or folding in on itself inadvertently. When the user folds the stroller 10, however, the end links 58 pivot at both ends to allow the frame structure 12 to fold in for storage.

As best seen in FIG. 3, the rear frame 16 comprises a hub 60 that interconnects a pair of tubular lower leg members 62 and a pair of tubular upper leg members 64. The leg members 62, 64 may be constructed of the same or similar materials used to construct the upper frame members 30-34. Each of the lower and upper leg members 62, 64 pivotably attach to hub 60. The lower leg members 62 extend outwardly from the hub 60 at respective angles, and pivotably connect to a rear wheel assembly 20. Similarly, the upper leg members 64 extend outwardly from the hub 60 at respective angles and pivotably connect to the intermediate frame members 32 via hinges 66. When moving between the folded and unfolded positions, the upper leg members 64 pivot about a pivot joint 68, which may be a rivet or other mechanical fastener that connects the leg member 64 to hinge 66.

The locking mechanism 22, which will be described in more detail later, pivotably attaches to the rear frame 16 via hub 60, and to the front frame 14 via a pair of tension members 74. In this embodiment, the tension members 74 comprise a pair of structural rods that bear both tension and compression loads when the frame structure 12 is in the unfolded position. As seen in later figures, the user may move the locking mechanism 22 between a locked position and an unlocked position. In the locked position, the locking mechanism 22 connects the front and rear frames 14, 16 together and functions as an over-center latch. When engaged, the locking mechanism 22 "pulls" the front and rear frames 14, 16 together to place the front and rear frames 14, 16 in tension. This tension prevents the frame structure 12 from collapsing or folding in on itself. When disengaged, the tension is released permitting the frame structure 12 to collapse or fold for storage.

The rear frame 16 may also comprise one or more non-elastic tension cords 76 that extend between the front and rear wheel assemblies 18, 20. The tension cords 76 prevent the frame elements from spreading apart during use when carrying a load.

The front wheel assembly 18, which is described in more detail later, comprises a pair of laterally-spaced, freely-rotating wheels disposed at the end of the lower frame members 34. To aid in steering the stroller 10, the front wheel assembly 18 may be configured to rotate freely. Each of the rear wheel assemblies 20 may also comprise one or more free-turning wheels, and are disposed at a terminal end of a lower leg member 62. As seen in the figures, the rear wheel assemblies 20 attach to the lower leg members 62 such that the wheels are substantially perpendicular to the ground surface. In some embodiments, however, the rear wheel assemblies 20 may attach to the lower frame members 62 such that the wheels of rear wheel assemblies 20 are slanted slightly inward toward hub 60. This may help to add stability to stroller 10. In the unfolded position, the wheels of the rear wheel assemblies 20 rotate freely when the user pushes the stroller 10. However, the user may prevent the wheels from rotating by engaging the wheels with a brake 78 disposed on one or both of the rear wheel assemblies 20.

Figure 4:
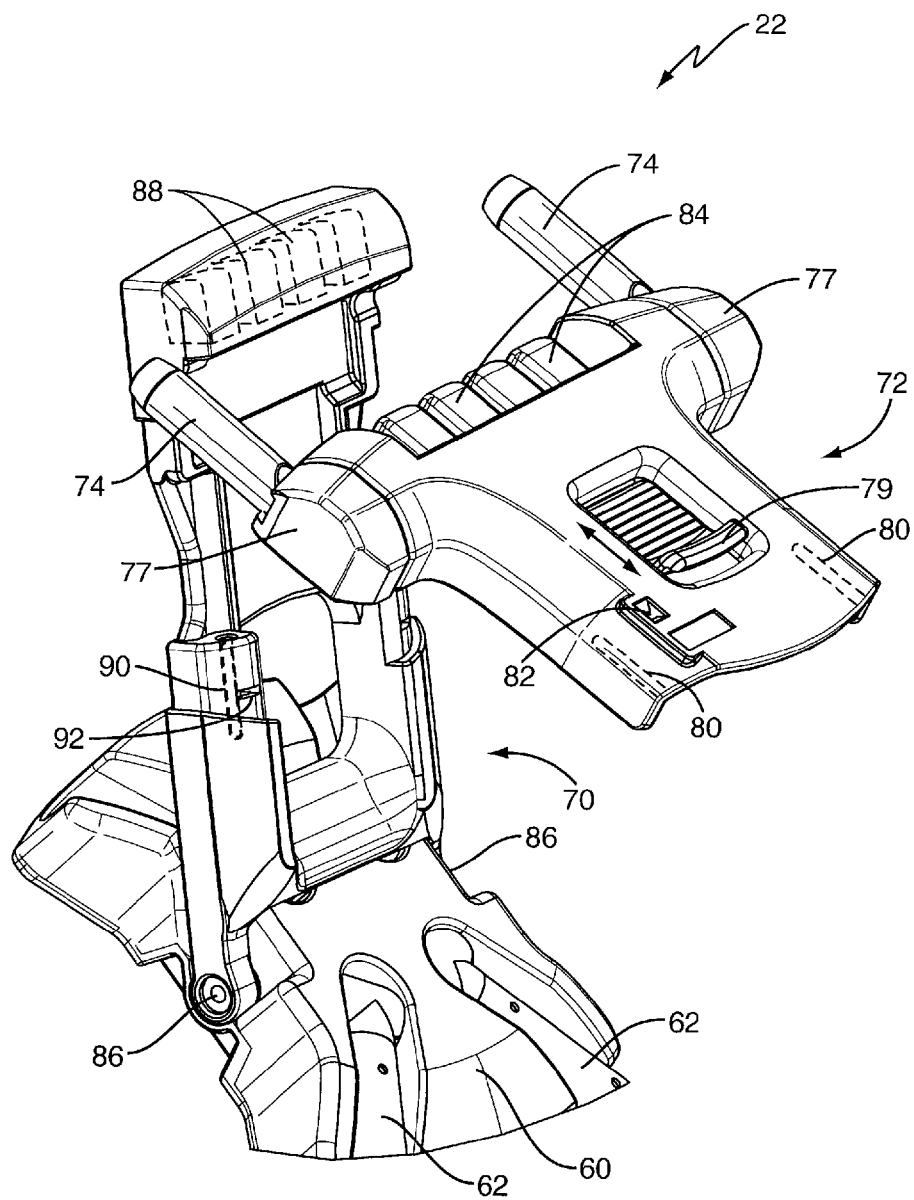
FIG. 4 is a perspective view of a locking mechanism configured according to one embodiment of the present invention in an unlocked state.
Figure 5:
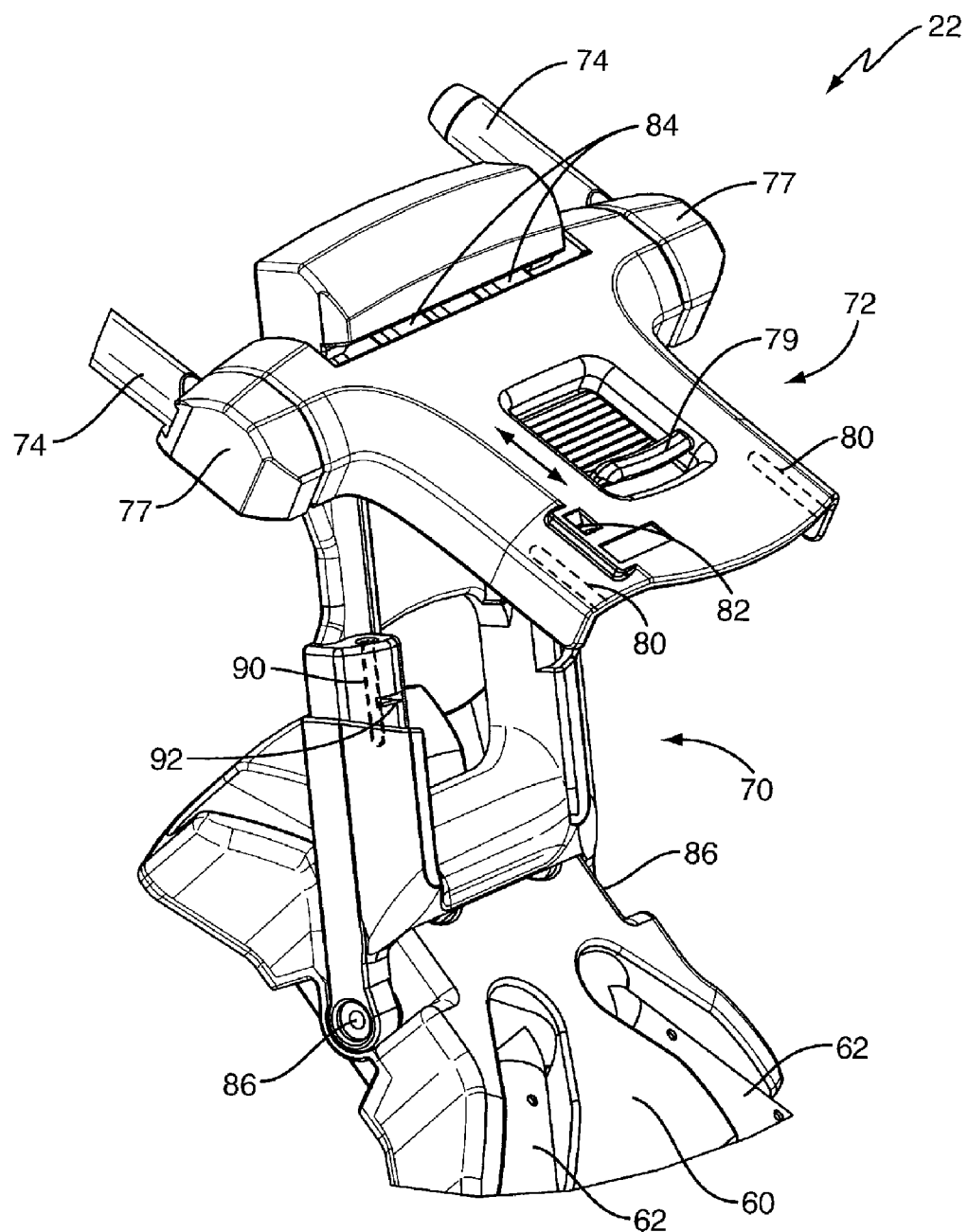
FIG. 5 is a perspective view of a locking mechanism configured according to one embodiment of the present invention moving between the locked and unlocked states.
Figure 6:
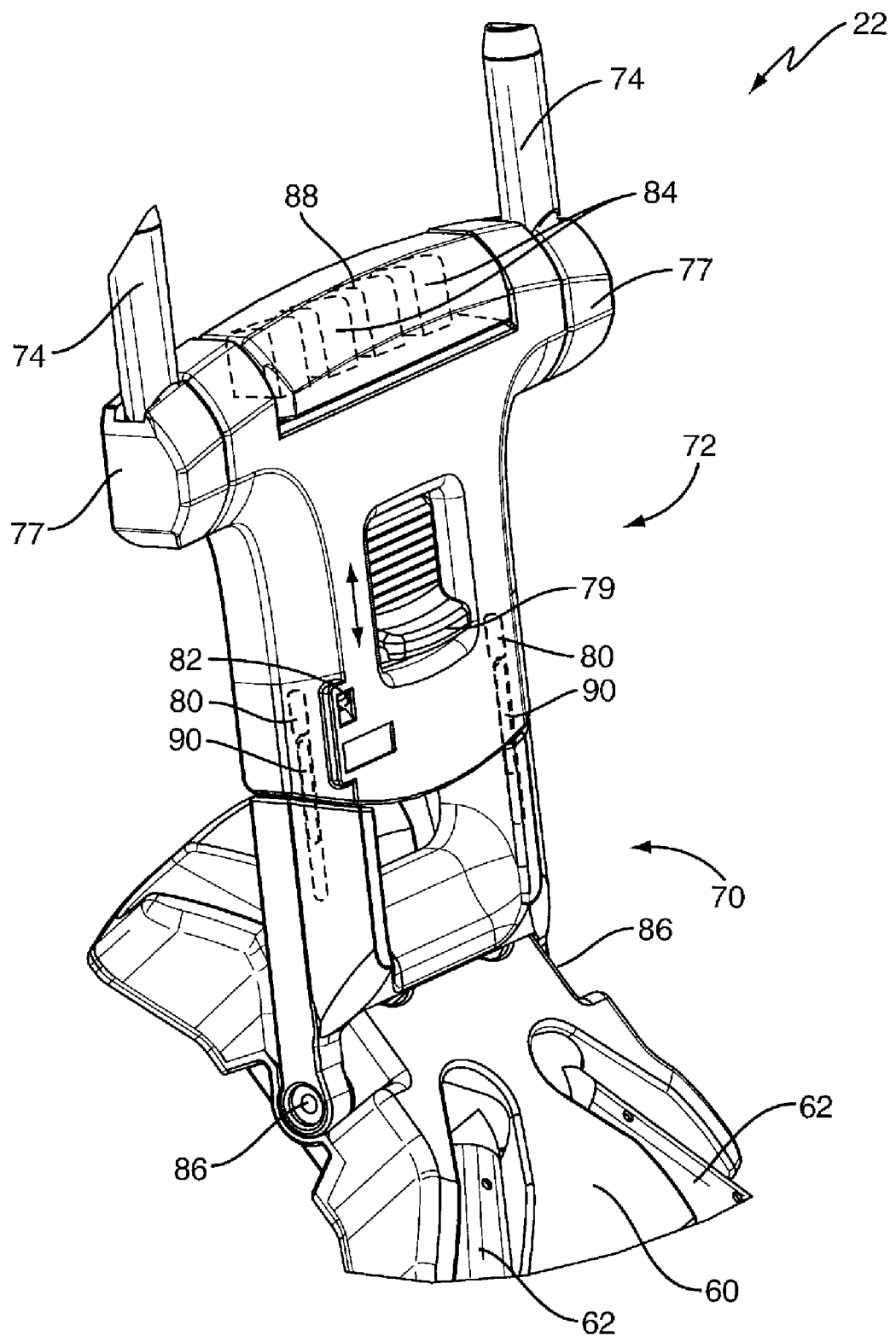
FIG. 6 is a perspective view of a locking mechanism configured in a locked state according to one embodiment of the present invention.

FIGS. 4-6 illustrate the locking mechanism 22 in more detail. As noted previously, the locking mechanism 22 functions as an over-center latch. The locking mechanism 22 comprises a base member 70 pivotally connected to the hub 60 of the rear frame 16 and a lever 72 connected by tension members 74 to the front frame 14. The base member 70 and lever 72 releasably engage each other to lock the frame structure 12 in an unfolded position. A safety latch prevents the base member 70 and lever 72 from inadvertently separating during use.

The base member 70 comprises a pair of opposing swivel joints 86 that pivotally connect the base member 70 to hub 60. A plurality of slots 88 are integrally formed on the lever 70. The slots 88 are sized and shaped to receive corresponding tabs 84 formed on the lever 72 as will be hereinafter described. The lever 72 comprises a pair of opposing pivot joints 77 connected to respective tension members 74, and one or more integrally molded tabs 84. The pivot joints 77 pivotally connect the tension members 74 to the lever 72. The tabs 84 are configured to insert into corresponding slots 88 on the base member 70 when engaging the lever 72 with the base member 70. As described in more detail later, the tension members 74, which are connected to the upper frame members 30, "pull" the front and rear frames 14, 16 together when the lever 72 is fully engaged with the base member 70. This places tension on the front and rear frames 14, 16 thereby preventing the frame structure 12 from inadvertently collapsing. Disengaging the lever 72 from the base member 70 releases the tension on the front and rear frames 14, 16. This absence of tension on the front and rear frames 14, 16 permits the frame structure 12 to collapse or fold freely for storage.

FIGS. 4 through 6 illustrate how the locking mechanism operates. When the stroller 10 is unfolded, the lever 72 is initially disengaged from the base member 70. To lock the stroller 10 in the unfolded position, the user inserts the tabs 84 of the lever 72 into slots 88 of the base member as shown in FIG. 4. The user then pivots the lever 72 towards the base member 70 as shown in FIG. 5 to engage the lever 72 with the base member 70. When the lever 72 is fully engaged as shown in FIG. 6, the frame structure 12 is locked in the unfolded position and will not collapse. The process is reversed to unlock the frame structure 12. To fold the stroller 10, the user pulls the lower end of the lever 72 away from the base member 70 and then withdraws the tabs 84 on the lever 72 from the corresponding slots 88 on the base member 70.

A safety latch may be provided to prevent the lever 72 from inadvertently disengaging from the base member 70 while the stroller 10 is in use. In the exemplary embodiment, the safety latch comprises a pair of metallic locking pins 90 disposed on the base member 70 and a corresponding pair of magnetic pins 80 disposed on the lever 72. Locking pins 90 and magnetic pins 80 are mounted in aligned holes in the base member 70 and lever 72 respectively. When the lever 72 is fully engaged with the base member 70, the magnetic pins 80 and the locking pins 90 align such that the magnetic pins 80 magnetically attract the locking pins 90. This magnetic attraction causes the metallic locking pins 90 to slide at least partially into the aligned holes on the lever 72 containing the magnetic pins 80. In this position, the metallic locking pins 90 will lie partly in both the base member 70 and lever 72. The position of the locking pins 90 prevents the lever 72 from inadvertently pulling away from the base member 70.

The user may determine whether the safety mechanism is engaged by viewing the metallic locking pins 90 through windows 82, 92 formed in the lever 72 and base member 70 respectively. If the user can see the metallic locking pins 90 through the aligned windows 82, 92, then the safety is engaged and it is safe to use the stroller 10. Conversely, if the metallic locking pins 90 are not visible through the windows 82, 92, the safety is likely not engaged and should be checked before using the stroller 10.

A release button 79 on the lever 72 is provided to release the safety latch. The release button 79 is mounted for sliding movement. To release the safety, the user simply slides button 79 downwardly in a direction away from tabs 84. When the release button 79 slides downward, it engages the magnetic pins 80 and causes the magnetic pins 80 to also slide downward. This "pushes" the metallic locking pins 90 back into the base member 70 such that they are entirely within the base member 70. The user may then pivot the lever 72 away from the base member 70. This breaks the magnetic attraction that maintains the connection between the magnetic pins 80 and the metallic locking pins 90. Once the magnetic connection is broken, the user may let go of release button 79. In embodiments where release button 79 is spring-loaded, the magnetic pins 80 retract upwardly with button 79 such that magnetic pins 80 lie entirely within lever 72 (FIG. 5). Similarly, the metallic locking pins 90 will remain entirely within the base member 70. After rotating the lever 72 away from the base member 70, the user can separate the lever 72 from the base member 70 as previously described. This disconnects the front frame 14 from the rear frame 16 and releases the tension provided by the tension members 74. Once the tension is released, the frame structure 12 collapses or folds in on itself for storage.

Figure 7:
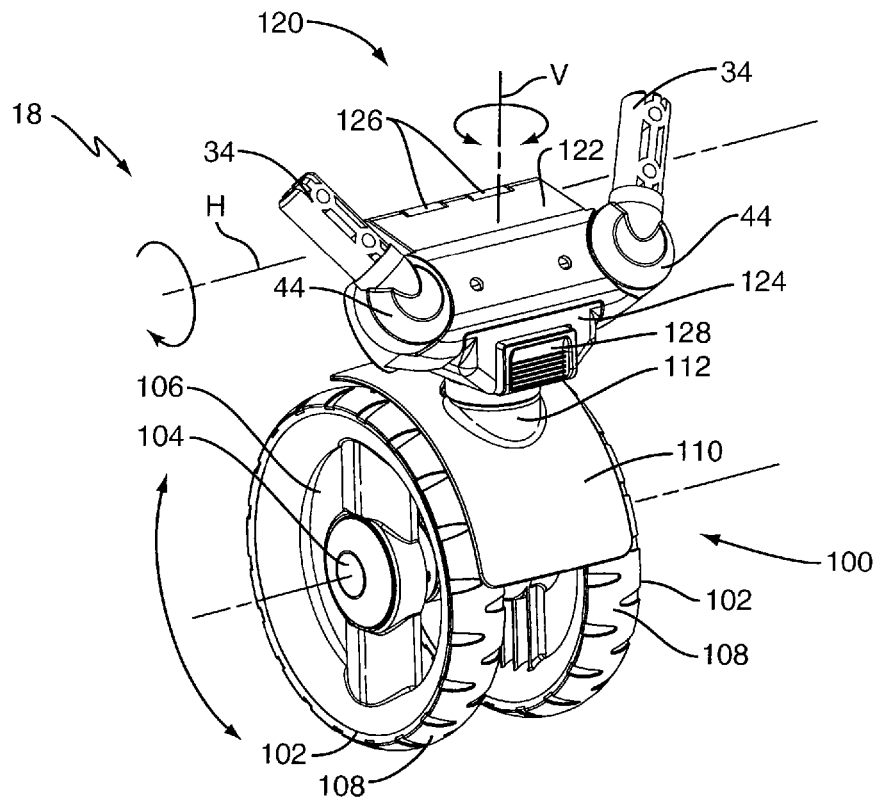
FIG. 7 is a perspective view illustrating a front wheel assembly suitable for use with one embodiment of the present invention.
Figure 8:
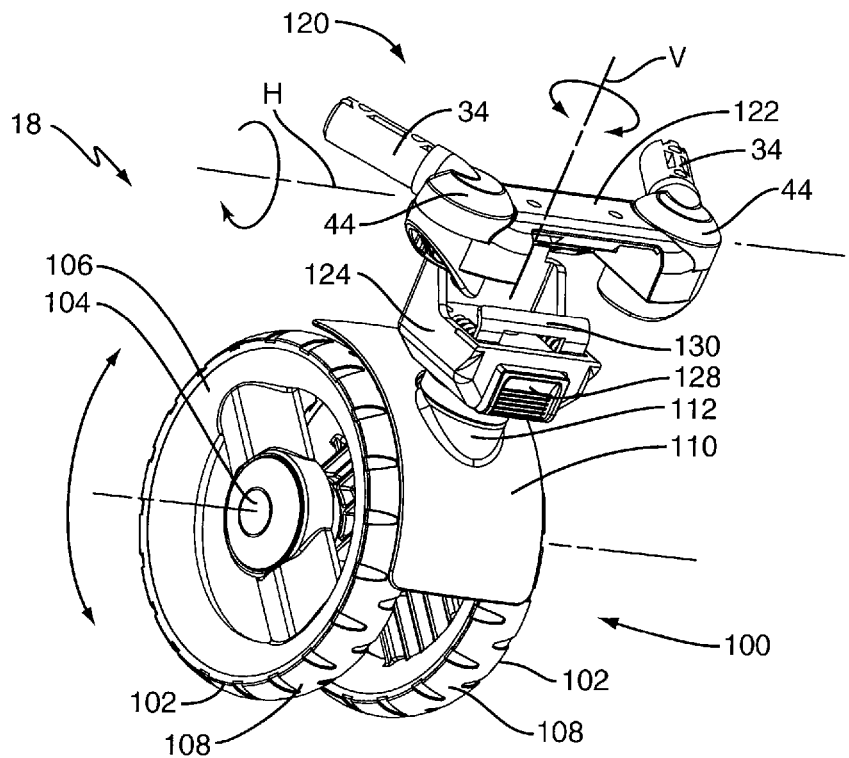
FIG. 8 is a perspective view illustrating how the front wheel assembly might rotate according to one embodiment of the present invention.

FIGS. 7-8 illustrate one embodiment of the front wheel assembly 18 in more detail. The front wheel assembly 18 comprises a caster wheel 100 and a hinge body 120 pivotably connected to each other by a swivel joint 112. The caster wheel 100 comprises a pair of spaced wheels 102 rotatably connected to an axle 104. Each wheel 102 comprises a molded plastic rim 106 having an elastomer outer portion 108. The elastomer portion 108 preferably has sufficient flexibility, elasticity, and gripping characteristics such that it may function like a tire tread. An optional flap 110 may be spaced from the wheels 102 to inhibit objects from falling between wheels 102.

The hinge body 120 connects to each side of the front frame 14 via corresponding pivot joints 44, and comprises a first part 122 pivotably connected to a second part 124 by hinge 126. The hinge 126 allows the first and second parts 122, 124 to open when the stroller 10 is folded for storage. An actuator, which in this embodiment is a button 110, allows the user to lock/unlock the front wheel assembly 18 for deployment and storage. Button 110 may be, for example, a spring-loaded button that normally biases a catch 130 to lock the front wheel assembly 18 towards the deployed position.

The front wheel assembly 18 may either be deployed for use or folded for storage. When deployed, the caster wheel 100 is locked in an extended position such that the wheels 102 contact the ground surface. To facilitate turning the stroller 10, each wheel 102 rotates freely about the axle 104. The swivel joint 112 allows the caster wheel 100 to rotate about a vertical axis V. When folded for storage, the front wheel assembly 18 pivots upwardly about a horizontal axis H into the foot rest 26. Particularly, pressing the button 128 operates the catch 130 to unlock the first and second parts 122, 124 from each other. Once unlocked, the user may pivot the front wheel assembly 18 about hinge 126 into the foot rest 26.

Figure 9:
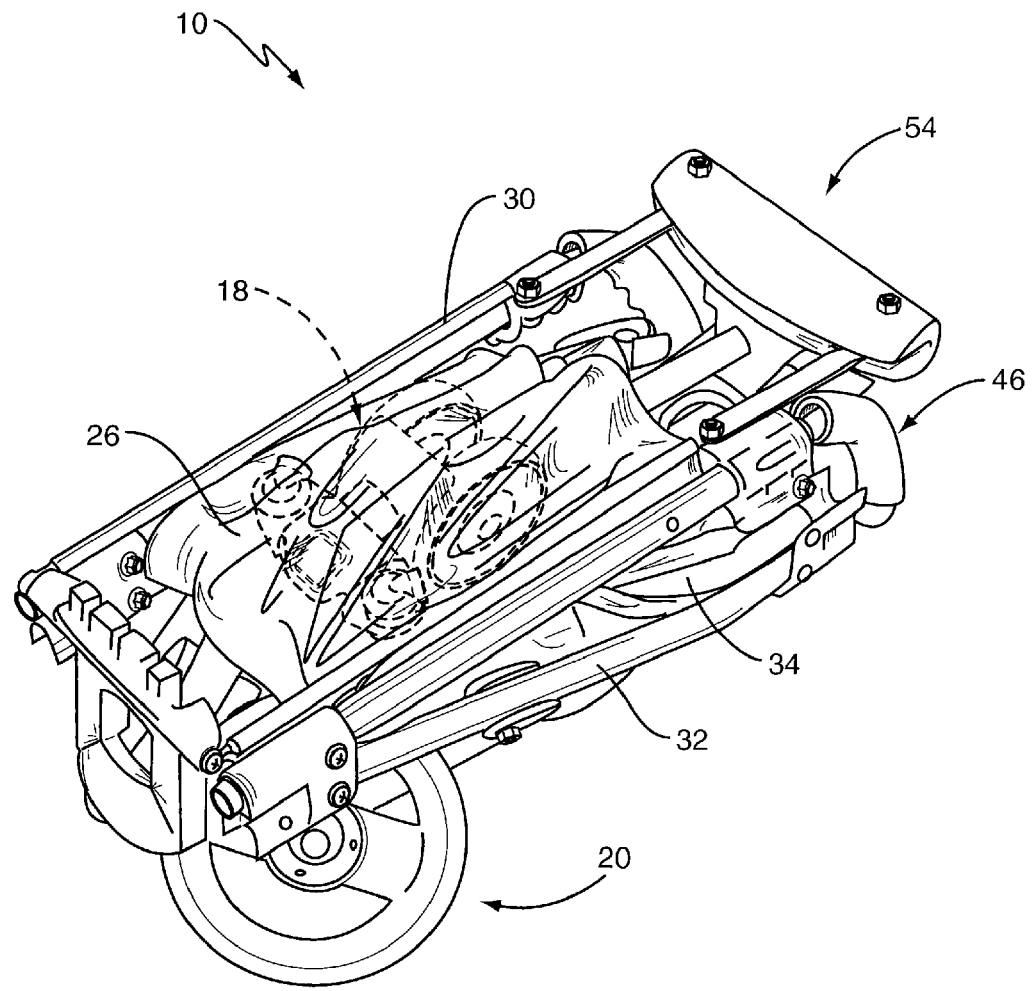
FIG. 9 is a perspective view of a support frame in a collapsed state according to one embodiment of the present invention.

FIG. 9 shows stroller 10 with the frame structure 12 in the collapsed or folded position for storage. As seen in FIG. 9, the frame members 30-34 and 62, 64 of the front and rear frames 14, 16, respectively, fold together. In addition, the front wheel assembly 18 is unlocked and is seated within the foot rest 26. Folding the front and rear frames 14, 16 and pivoting the wheel assembly 18 into the foot rest 26 reduces the dimensions of stroller 10. However, handles 46 also slide downward into the upper frame members 30 to reduce the height dimension even further.

The present invention may, of course, be carried out in other ways than those specifically set forth herein without departing from essential characteristics of the invention. For example, the locking mechanism 22 is described above as being a magnetic lock. However, the present invention may employ other types of locking mechanisms as well, such as those that are spring-loaded or those that utilize release-catch mechanisms. In some embodiments, lever 72 and/or base member 70 may "snap" together such that the lever 72 and base member 70 will only engage/disengage responsive to a predetermined amount of force. Regardless of the particular type of locking mechanism used, however, the locking mechanism 22 moves between a locked position and an unlocked position. In the locked position, the locking mechanism 22 pulls the front and rear frame members 14, 16 together to place tension on the front and rear frame members 14, 16. This tension prevents the frame structure 12 from collapsing.

The present embodiments are to be considered in all respects as illustrative and not restrictive, and all changes coming within the meaning and equivalency range of the appended claims are intended to be embraced therein.

What is claimed is:

1. A collapsible frame structure movable between an unfolded position for use and a folded position for storage, the frame structure comprising:
   a front frame disposed on a front of the frame structure and comprising a plurality of first frame members;
   a rear frame disposed on a rear of the frame structure and comprising:

a plurality of second frame members; and
a hub that pivotably connects the plurality of second frame members;
wherein at least two of the frame members connect the hub to the front frame;
a pair of tension rods connected to the front frame;
an locking mechanism movable between an engaged position and a disengaged position for locking said front and rear frames in the unfolded position, said locking mechanism comprising:
a base member pivotably connected to the hub; and
a lever connected to the pair of tension rods, and configured to releasably attach to the base when the locking mechanism is in the engaged position, and to detach from the base when the locking mechanism is in the disengaged position; and
wherein the locking mechanism is configured to apply tension to the tension rods and pulls the front and rear frames towards each other to maintain the frame structure in the unfolded position when the base member and lever are engaged.

2. The frame structure of claim 1 wherein the lever and the base member are configured as an over-center latch.

3. The frame structure of claim 2 further comprising a magnetic safety to prevent the lever from inadvertently disengaging from the base member.

4. The frame structure of claim 3 wherein the magnetic safety comprises a magnetic pin slidingly disposed in the lever, and a metallic locking pin slidingly disposed in the base member.

5. The frame structure of claim 4 wherein the lever comprises a latch configured to slide the magnetic pin within the lever.

6. The frame structure of claim 4 wherein the magnetic pin is configured to magnetically attract the metallic locking pin when the lever is engaged with the base member such that a portion of the magnetic locking pin slides into the lever.

7. The frame structure of claim 1 further comprising a flexible material attached to the front frame to form a seat and a footrest, and a front wheel assembly pivotably connected to the front frame.

8. The frame structure of claim 7 wherein the front wheel assembly is configured to pivot about a first axis to fold into the footrest when the frame structure is in the folded position.

9. The frame structure of claim 8 wherein the front wheel assembly comprises a hinge that allows the front wheel assembly to pivot about the first axis.

10. The frame structure of claim 8 wherein the front wheel assembly comprises a swivel joint that permits the front wheel assembly to pivot about a second axis when the frame structure is in the unfolded position, the first axis being substantially perpendicular to the second axis.

11. The frame structure of claim 7 wherein the front wheel assembly extends away from the front frame when the locking mechanism moves to the locked position, and pivots towards the front frame when the locking mechanism moves to the unlocked position.

12. The frame structure of claim 1 wherein the plurality of first frame members form the sides of the frame structure, each side comprising an upper frame member and a lower frame member pivotably connected to an opposing end of an intermediate frame member.

13. The frame structure of claim 12 further comprising a pair of handles, and wherein each handle slidingly engages a respective upper frame member.

14. The frame structure of claim 13 wherein each handle slides into its respective upper frame member when the frame structure moves to the folded position.

15. The frame structure of claim 12 wherein the upper and lower frame members pivot towards their respective intermediate frame members when the frame structure moves to the folded position.

16. The frame structure of claim 1 further comprising an articulated cross-member extending between opposing sides of the front frame, the cross-member configured to push on the sides of the front frame when the locking mechanism moves to the locked position.

17. The frame structure of claim 16 wherein the articulated cross-member is further configured to allow the front frame to fold when the locking mechanism moves to the unlocked position.

18. The frame structure of claim 1 further comprising a piece of flexible material extending between the first frame members.

19. The frame structure of claim 18 wherein the flexible material forms a seat and a foot rest when the locking mechanism is in the locked position.

20. The frame structure of claim 1 wherein at least two of the second frame members connect the hub to the front frame.

21. The frame structure of claim 20 further comprising a pair of rear wheel assemblies, and wherein at least two of the second frame members connect the hub to the rear wheel assemblies.

22. The frame structure of claim 1 wherein the pair of tension members pivotably connect the lever to the front frame, and wherein the tension members pull the front and rear frames towards each other when the base member and lever are engaged.

23. The frame structure of claim 1 wherein the lever includes one or more corresponding tabs configured to:
insert into one or more slots integrally formed in the base to releasably attach the lever to the base when the locking mechanism is in the engaged position; and
separate from the slots to detach the lever from the base when the locking is in the disengaged position.

24. A collapsible frame structure movable between an unfolded position for use and a folded position for storage, the frame structure comprising:
a first frame comprising a plurality of first frame members;
a second frame comprising:
a plurality of second frame members; and
a hub that pivotably connects the plurality of second frame members;
wherein at least two of the frame members connect the hub to the first frame;
a pair of tension rods connected to the first frame;
an locking mechanism movable between an engaged position and a disengaged position for locking said first and second frames in the unfolded position, said locking mechanism comprising:
a base member pivotably connected to the hub; and
a lever connected to the pair of tension rods, and configured to releasably attach to the base when the locking mechanism is in the engaged position, and to detach from the base when the locking mechanism is in the disengaged position; and
wherein the locking mechanism is configured to apply tension to the tension rods and pulls the first and second frames towards each other to maintain the frame structure in the unfolded position when the base member and lever are engaged.

25. A collapsible frame structure movable between an unfolded position for use and a folded position for storage, the frame structure comprising:
- a first frame comprising a plurality of first frame members;
- a second frame comprising:
  - a plurality of second frame members; and
  - a hub that pivotably connects the plurality of second frame members;
- a pair of tension rods connected to the first frame;
- a locking mechanism movable between an engaged position and a disengaged position for locking said first and second frames in the unfolded position, said locking mechanism comprising:
  - a base member pivotably connected to the hub; and
  - a lever connected to the pair of tension rods, and configured to releasably attach to the base when the locking mechanism is in the engaged position, and to detach from the base when the locking mechanism is in the disengaged position;
- wherein the base member and lever are configured as an over-center latching mechanism; and
- wherein in the engaged position, the locking mechanism applies tension to the tension rods and pulls the first and second frames towards each other to maintain the frame structure in the unfolded position.

* * * * *